United States Patent
Park (10) Patent No.: US 6,975,566 B2
(45) Date of Patent: Dec. 13, 2005

(54) SERVO METHOD FOR OPTICAL RECORDING MEDIUM

(75) Inventor: Sang On Park, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 371 days.

(21) Appl. No.: 09/930,466

(22) Filed: Aug. 16, 2001

(65) Prior Publication Data

US 2002/0021632 A1 Feb. 21, 2002

(30) Foreign Application Priority Data

Aug. 16, 2000 (KR) ......................................... 2000-47168

(51) Int. Cl.[7] .................................................. G11B 7/00

(52) U.S. Cl. .................................. 369/44.28; 369/53.28

(58) Field of Search ........................... 369/44.25, 44.27, 369/44.28, 44.29, 44.32, 44.35, 47.17, 47.55, 53.28, 53.37, 53.33

(56) References Cited

U.S. PATENT DOCUMENTS 5,537,374 A * 7/1996 Wachi ..................... 369/44.34

* cited by examiner

Primary Examiner—Paul W. Huber
(74) Attorney, Agent, or Firm—Birch, Stewart, Kolasch & Birch, LLP

(57) ABSTRACT

A servo method for an optical recording medium for detecting a tracking error signal by a push-pull method is disclosed. Before a servo operation, an amount of DC offset per track is obtained as an object lens of an optical pickup is moved in a specified direction, and a tracking servo is performed by compensating for a tracking error signal based on an initial amount of DC offset obtained by multiplying the amount of DC offset generated per track by the number of jumped tracks when the object lens is shifted. After movement of a sled by driving a sled servo, a sled servo is performed by compensating for the tracking error signal based on a value obtained by subtracting an amount of sled movement from the initial amount of DC offset, and thus an optical beam can always follow a track center even when the DC offset is generated in the tracking error signal.

15 Claims, 8 Drawing Sheets

FIG. 1
Blackground Art

FIG. 2A
Blackground Art

FIG. 2B
Blackground Art

FIG. 2C
Blackground Art

FIG. 2D
Blackground Art

FIG. 3
Blackground Art

FIG. 4
Blackground Art

SERVO METHOD FOR OPTICAL RECORDING MEDIUM

BACKGROUND OF THE INVENTION

1. Field of the Invention

The present invention relates to a system for an optical recording medium, and more particularly, to a servo method for a push-pull type optical recording medium.

2. Background of the Related Art

With the growth of audio and video media, an optical recording/reproducing apparatus for recording and reproducing video and audio data in a semi-permanent optical recording medium has been developed.

An optical recording medium, and especially an optical disc used for data recording and reproduction in the optical recording/reproducing apparatus is classified into three types according to its function and purpose: a read only memory (ROM) type, write one read many (WORM) type on which data can be written only once, and rewritable type on which data can be repeatedly written.

Here, as the ROM type optical disc, there exist a compact disc read only memory (CD-ROM), digital versatile disc read only memory (DVD-ROM), etc., and as the WORM type optical recording medium, there exist a recordable compact disc (CD-R) on which data can be written only once, recordable digital versatile disc (DVD-R) on which data can be written only once, etc.

Meanwhile, as the rewritable optical disc, there exist a rewritable compact disc (CD-RW), rewritable digital versatile disc (DVD-RW, DVD-RAM, and DVD+RW), etc.

Various methods of controlling a tracking such as a three-beam method, push-pull (PP) method, differential phase detection (DPD) method, etc., have been used in the optical discs of a CD or DVD series.

Here, according to the three-beam method, a pair of side beam spots for the tracking are arranged in front and rear of a main beam spot for decoding information, respectively. That is, the side beams are arranged opposite to each other from a track center by ¼ of a track width. This arrangement of the side beams is for preventing an omission of detected signals and for avoiding a cross talk from an adjacent track.

Figure 1:
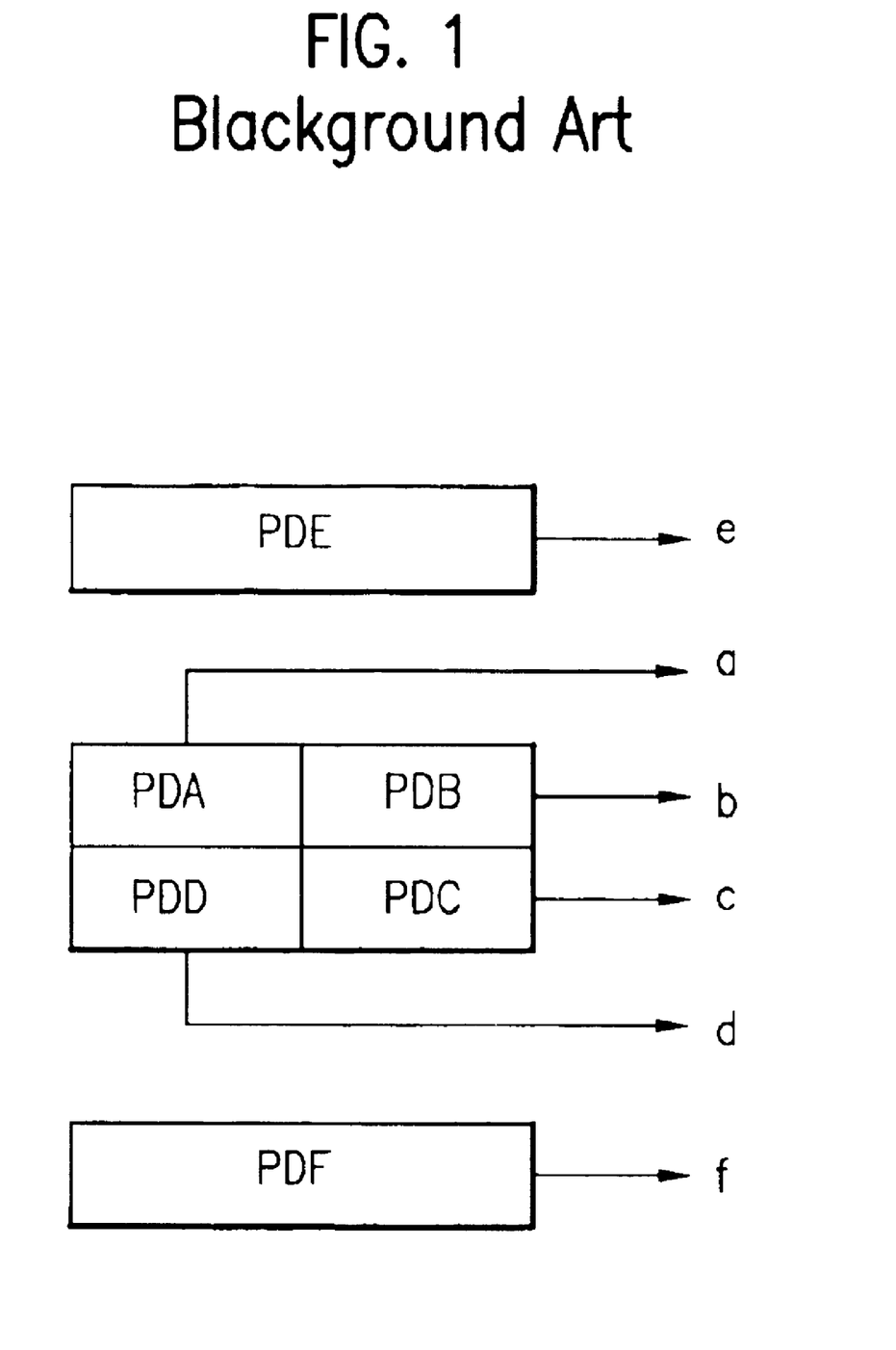
FIG. 1 is a view illustrating an arrangement of a general optical detector composed of a center optical detection elements and side optical detection elements.

At this time, an optical detector includes a center optical detection element for detecting a light quantity of the main beam, and side optical detection elements for detecting a light quantity of the side beam. For example, as shown in FIG. 1, the center optical detection element is composed of four optical detection elements PDA, PDB, PDC, and PDD divided in a signal track direction and in a radial direction of the optical disc, respectively. Two side optical detection elements PDE and PDF are positioned on upper and lower ends of the center optical detection element, respectively. Here, a tracking error signal is obtained by calculating "e−f" with respect to electric signals e and f outputted from the side optical detection elements PDE and PDF.

Also, according to the push-pull (PP) method, the optical detection elements of the optical detector are divided into two parts in the track direction, and a tracking error signal is detected from a light quantity balance of the two-part optical detection elements. Specifically, this method uses the fact that the intensity distribution of light, that is diffracted and reflected by a pit and then incident again to an object lens, varies according to the relative variation of positions of the pit and spot.

At this time, if the shadow of the pit is equally detected by the both optical detection elements, the tracking error (TE) signal becomes "0", and this state is called a tracking-on (or on-track) state. On the contrary, if the optical beam deviates left and right from the track center, the tracking error (TE) signal has a positive (+) or negative (−) value, and this state is called a tracking-off (or off-track) state.

In case that the optical detector is divided into 4 optical detection elements PDA, PDB, PDC, and PDD in the signal track direction and radial direction of the optical disc, the tracking error signal according to the PP method can be obtained by calculating "(a+d)−(b+c)" with respect to the electric signals a, b, c, and d outputted from the optical detection elements of the optical detector. At this time, in case that the optical detector is divided into two parts in the track direction, the tracking error signal (=I1−I2) is detected from the light quantity balance of two photodiodes I1 and I2. That is, "a+d" of FIG. 1 corresponds to I1, and "b+d" corresponds to I2.

If it is assumed that the optical detector is the same as in FIG. 1, the main beam push-pull (BPP) signal can be obtained by calculating "(a+d)−(b+c)" with respect to the electric signals a, b, c, and d outputted from the center optical detection element of the optical detector, and the side beam push-pull (SPP) signal can be obtained by calculating "e−f" with respect to the electric signals e and f. Also, the differential push-pull (DPP) signal can be obtained by calculating "MPP-SPP". Here, in case that the optical detector is composed of 4 divided optical detection elements PDA, PDB, PDC, and PDD in the signal track direction and radial direction of the optical disc, or 2 divided optical detection elements I1 and I2 in the track direction, the PP signal and MPP signal have the same concept.

At this time, the MPP method has several conditions. According to one among them, if the wavelength of the light is λ and the depth of the pit is λ/4, i.e., if the diffraction by the pit is most effective and the depth of modulation becomes maximum, the tracking error signal cannot be obtained through the MPP method. In other words, since the pattern becomes symmetric when the depth of the pit is λ/4, the tracking error signal cannot be obtained through the 2-divided optical detector.

Meanwhile, the DPD method is an improvement of the MPP method. In the same manner as the MPP method, the DPD method uses the intensity distribution of light according to the relative positional change of the beam and pit, but it uses the 4-divided optical detector instead of the 2-divided optical detector.

Specifically, according to the DPD method, the intensity distribution of the light is received through the 4-divided optical detection elements, and the tracking error signal is generated through the detection of the phase difference in the radial direction.

Accordingly, the tracking error signal is outputted even if the depth of the pit is λ/4, and is not much affected by movement of the beam on the optical detector as well.

In case that the optical detector is divided into 4 optical detection elements PDA, PDB, PDC, and PDD in the signal track direction and radial direction of the optical direction, the DPD method obtains the tracking error signal through the detection of the phase difference between the electric signals of "a+c" and "b+d" based on the RF signal of "a+b+c+d" obtained from the electric signals a, b, c, and d outputted from the respective optical detection elements.

For example, the existing CD generates the tracking error signal using the three-beam method, and the CD recorder generates the tracking error signal using the differential push-pull (DPP) method. At this time, in case that the signal outputted from the center optical detection element is received and the tracking error signal is detected using the MPP method, the quantity of the MPP signal becomes great, and a DC offset is produced through a lens shift.

Accordingly, the CD recorder generates the tracking error signal in a manner that the DC offset is minimized using the DPP (DPP=MPP−SPP) method, i.e., using the signal obtained in the main push-pull (MPP) method and side push-pull (SPP) method, to solve the DC offset problem in the MPP method.

Also, the DVD-ROM generates the tracking error signal using the DPD method. Specifically, since the depth of the pit is λ/4 in case of the DVD-ROM, the tracking error signal cannot be detected through the MPP method. Thus, the DVD-ROM obtains the tracking error signal using the DPD method. Also, the DVD-R/RW detects the tracking error signal using the DPD method in case of reproducing a region where the signal is recorded, while it detects the tracking error signal using the MPP method in case of recording the signal. Also, the DVD-RAM detects the tracking error signal using the DPD method only with respect to a pre-pit region, while it detects the tracking error signal using the MPP method with respect to other regions.

Meanwhile, after the tracking error signal is detected using one among the above-described methods, a tracking servo should be performed using the detected tracking error signal. At this time, as the tracking servo driving method, there exist a method of driving the object lens only, and a method of driving the whole optical pickup. Here, in order to move the whole optical pickup, a sled motor should be driven by a sled servo.

Also, in case of a seek or search operation for searching a desired position on the optical disc, there exist a method of driving the object lens only, and a method of driving the whole optical pickup. Specifically, in case of a rough seek for Specifically, in case of a rough seek for jumping over several hundred tracks to several thousand tracks to reach a target track, the whole optical pickup is moved near the desired track through the drive of the sled motor, and then in case of a fine seek for jumping over several hundred tracks or less, the target track is sought only using the object lens of a tracking actuator.

Meanwhile, in case that the tracking error signal is detected by the MPP method as the object lens of the tracking actuator is moved left and right through the lens shifting method during the tracking servo, the spot is moved on the optical detector, and the DC offset is produced in the tracking error signal. That is, the DC offset is produced in the tracking error signal through the lens shift although the optical beam is positioned on the center track, and this causes the center of the reflected light not to coincide with the center of the optical detector. Here, The DC offset means that the position of the spot leans to the upper or lower part of the optical detector. In this case, since the optical beam is on the track center, the DC offset state should be maintained as it is.

Figure 2A:
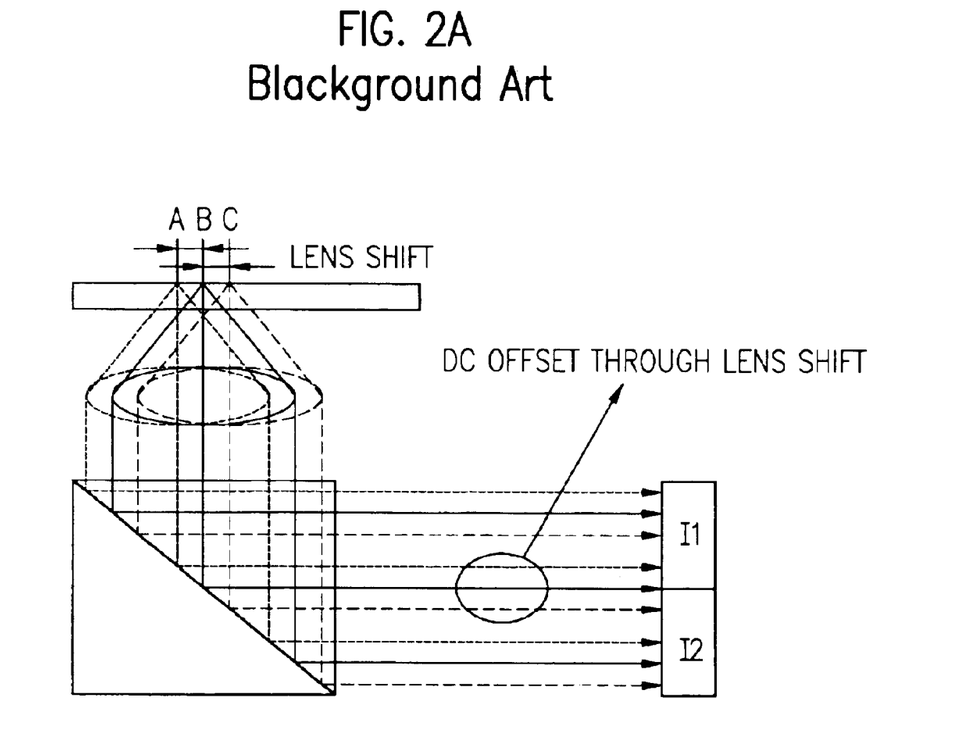
FIG. 2A is a view illustrating the DC offset generated through a lens shift.
Figure 2B:
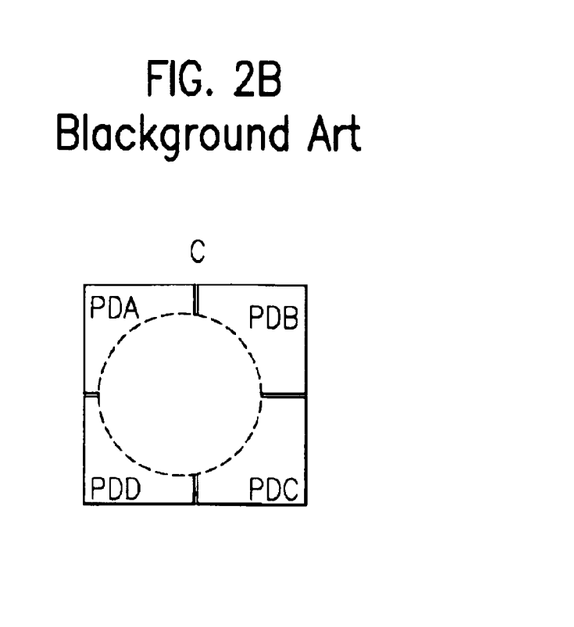
FIGS. 2B to 2D are views illustrating examples of reflected optical beams detected by an optical detector at positions A, B, and C of FIG. 2A.
Figure 2C:
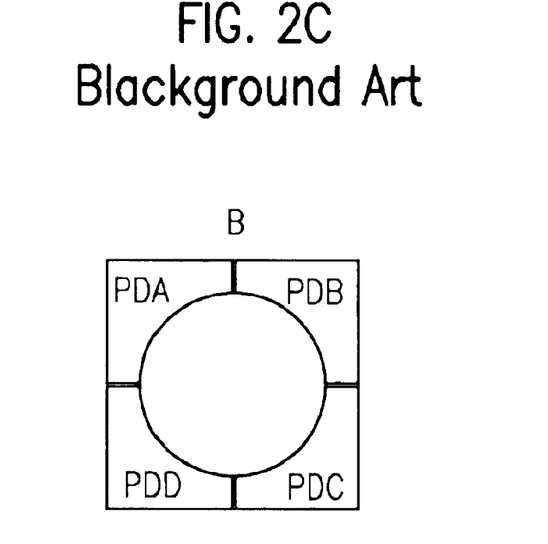
Figure 2D:
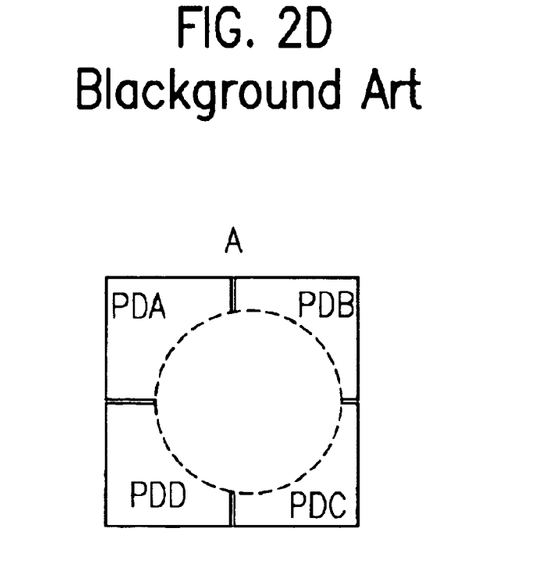

As shown in FIG. 2A, if it is assumed that B indicates the normal focusing state that no lens shift is performed and A and C indicate the shifted positions of the object lens, FIGS. 2B to 2D show examples of the reflected light detected by the optical detector. That is, if it is assumed that the optical beam is positioned on the track center, the center of the reflected light coincides with the center of the optical detector as shown in FIG. 2C in case that the lens shift does not exist, and the center of the reflected light does not coincide with the center of the optical detector due to the DC offset as shown in FIGS. 2B and 2D in case that the lens shift is performed. Here, FIG. 2B shows an example that the DC offset is produced toward I2, and FIG. 2D shows an example that the DC offset is produced toward I1.

Figure 3:
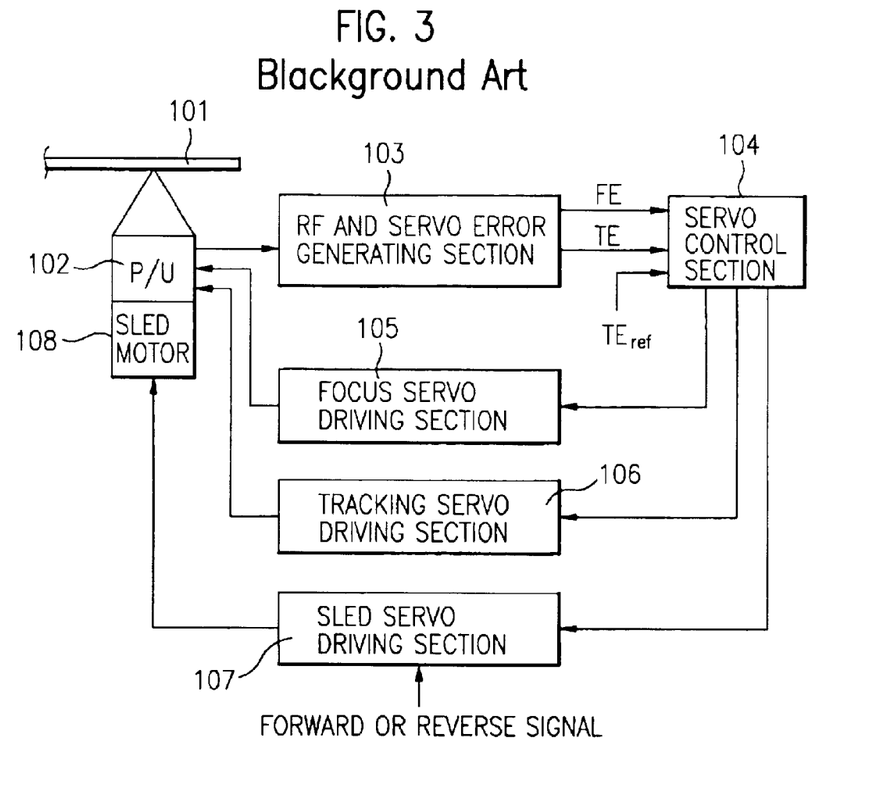
FIG. 3 is a block diagram of a general optical recording/reproducing apparatus for performing a servo of an optical recording medium.

Then, a servo control section in the conventional optical recording/reproducing apparatus as shown in FIG. 3 judges that the optical beam deviates from the track center, and produces a control signal for controlling the center of the reflected light and the center of the optical detector to coincide with each other. Accordingly, the optical beam may deviate from the track center.

FIG. 3 is a block diagram illustrating the construction of the general optical disc recording/reproducing apparatus. Referring to FIG. 3, an optical pickup 102, under the control of a servo control section 104, puts the optical beam condensed by the object lens on the signal track of the optical disc 101. The light reflected from a signal recording surface is condensed again by the object lens, and then incident to the optical detector for detecting a focus error signal and tracking error signal.

For example, the optical detector is composed of a plurality of optical detection elements as shown in FIG. 1, and electric signals in proportion to the light quantities obtained by the respective optical detection elements are outputted to an RF and servo error generating section 103.

The RF and servo error generating section 103 detects an RF signal for data reproduction, and the focus error (FE) signal, tracking error (TE) signal, etc., for servo control from the electric signals outputted from the respective optical detection elements of the optical detector.

The detected RF signal is outputted to a data decoder (not illustrated) for reproduction, and the servo error signals such as the FE signal, TE signal, etc., are outputted to the servo control section 104.

The servo control section 104 outputs a drive signal for controlling the focus to a focus servo driving section 105 by processing the focus error (FE) signal, and outputs a drive signal for controlling the tracking to a tracking servo driving section 106 by processing the tracking error (TE) signal.

Then, the focus servo driving section 105 moves the optical pickup 102 up and down by driving the focus actuator in the optical pickup 102, so that the optical pickup 102 follows the up/down movement of the rotating optical disc 101.

The tracking servo driving section 106 moves the object lens of the optical pickup 102 in the radial direction by driving the tracking actuator in the optical pickup 102, and thus corrects the position of the beam to follow a specified track.

Also, in case of moving the whole optical pickup, a sled servo driving section 107 receives a sled control signal and forward (or reverse) signal from the servo control section 104, and drives a sled motor 108 to directly move the optical pickup body in a desired direction. Specifically, the servo control section 104 generates the sled control signal using the tracking error signal, and outputs the sled control signal to the sled servo driving section 107. That is, the tracking error signal becomes symmetric, i.e., positive (+) or negative (−), when the optical pickup 102 is not positioned on the center of the track. Meanwhile, the sled servo driving section 107 drives the sled motor 108 so that the rotation of the sled motor 108 corresponds to the quantity of output of the optical pickup 102, and this means that the control voltage of the sled motor 108 changes the rotating number of the sled motor to change the speed of the sled motor. For example, the forward signal inputted to the sled servo driving section 107 is the positive or negative voltage applied to the sled motor 108, and makes the sled motor 108 rotate to move the optical pickup 102 in the desired direction.

Figure 4:
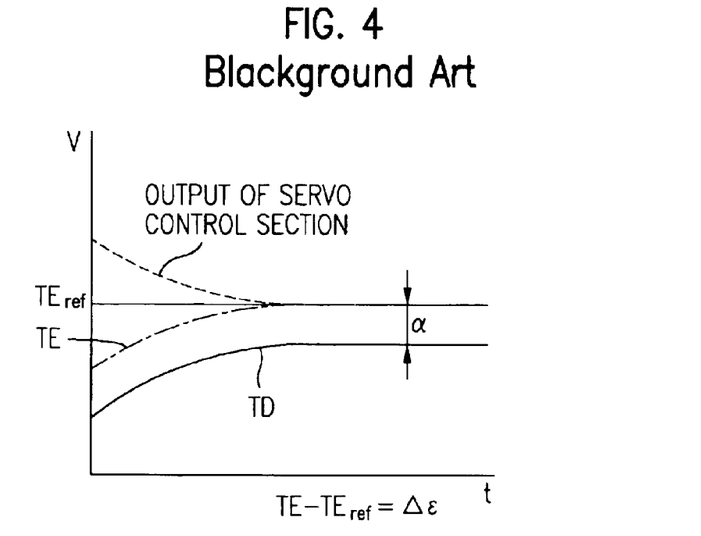
FIG. 4 is a graph showing the operation of a servo control section and tracking servo control section of FIG. 3 when the DC offset is produced through the lens shift.

For example, as shown in FIG. 4, if it is assumed that a control reference voltage (i.e., center voltage TEref) is determined and the tracking error (TE) signal is inputted from the RF and servo error generating section 103, the servo control section 104 generates the tracking control signal so that the difference between the tracking error (TE) signal and reference voltage Teref ($\Delta\epsilon$=TE−TEref) becomes "0" if $\Delta\epsilon$ is not "0". Then, the tracking servo driving section 106 generates a tracking drive (TD) signal in proportion to the tracking control signal outputted from the servo control section 104, and drives the tracking actuator in the optical pickup 102. If the tracking actuator is driven, the tracking drive voltage increases to move the object lens of the optical pickup 102 in the radial direction.

At this time, the servo control section 104 considers that the optical beam follows the track center when $\Delta\epsilon$ becomes "0".

However, since the DC offset exists in the tracking error (TE) signal that has already inputted through the lens shift, the tracking drive (TD) signal outputted from the tracking servo driving section 106 has the DC offset as much as $\alpha$. Accordingly, the tracking servo driving section 106 is overdriven as much as $\alpha$.

As a result, the optical beam deviates from the track center. In this case, the tracking actuator cannot follow the track center often. Especially, if the DC offset becomes great, the tracking servo cannot follow the corresponding track, and thus the tracking servo becomes off. This causes the recording/reproduction of data to be difficult.

In particular, since the DVD recorder controls the tracking only using the MPP method during the recording operation, it is greatly affected by the DC offset generated by the lens mechanism. That is, as high-density DVDs are provided, the DC offset exerts a great effect on the cross talk or cross eraser (i.e., erasing data recorded on the neighboring track by affecting the neighboring track during the recording operation) Also, in the DVD-R/RW having a small PP signal, the gain of the sled motor should be increased to obtain the track control, and this causes a fatal influence to be exerted by the DC offset.

Meanwhile, even in case of moving the whole optical pickup by driving the sled motor 108, the DC offset may cause a problem.

Specifically, a dead zone exists in the sled motor 108. The dead zone means a region where the sled motor 108 cannot move. The sled motor 108 does not move until the input voltage becomes a predetermined level due to an initial frictional force.

If a voltage less than the predetermined level is applied to the sled motor 108, the sled motor 108 does not operate even with a power consumption, and the object lens is continuously moved in the radial direction.

Accordingly, in order to quickly drive the sled motor 108, i.e., in order to make the sled motor 108 quickly escape from the dead zone, the conventional method uses the increase of the gain of the sled motor 108. However, the increase of the gain may cause a transient response.

SUMMARY OF THE INVENTION

Accordingly, the present invention is directed to a servo method for an optical recording medium that substantially obviates one or more problems due to limitations and disadvantages of the related art.

An object of the present invention is to provide a servo method for an optical recording medium that performs a tracking servo by measuring in advance an amount of DC offset generated through the shift of an object lens before a servo operation, and compensating for a tracking error signal based on an amount of DC offset measured whenever the object lens is shifted.

Another object of the present invention is to provide a servo method for an optical recording medium that performs a sled servo by compensating for an amount of initial DC offset with respect to a tracking error signal before movement of a sled, and performs a tracking servo by compensating for the amount of initial DC offset and an amount of sled movement with respect to the tracking error signal after the movement of the sled.

Still another object of the present invention is to provide a servo method for an optical recording medium that performs a tracking servo by detecting in advance an amount of DC offset per track generated through the shift of an object lens before a servo operation, and compensating for the amount of DC offset per track with respect to a tracking error signal during a normal servo operation for recording/reproduction.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a servo method for an optical recording medium comprises the steps of (a) detecting an amount of offset as moving an object lens of an optical pickup in a specified direction, and (b) performing a tracking servo by generating a tracking drive signal as compensating for the amount of offset with respect to a tracking error signal during a normal servo operation.

Preferably, the step (a) comprises the steps of detecting a first tracking drive signal as performing a still function in a reference position where no object lens shift is performed after turning on the tracking servo and turning off a sled servo, detecting a second tracking drive signal as performing a still function after performing an n-track jump (i.e., still) through the object lens shift in either of inner and outer periphery directions from the reference position, detecting a third tracking drive signal as performing a still function after performing a 2n-track jump through the object lens shift in a direction opposite to the direction at the second tracking drive signal detection step, and detecting the amount of DC offset per track generated through the object lens shift from the first to third tracking drive signals obtained at the tracking drive signal detection steps.

Preferably, the step (b) further comprises the step of if an N-track jump command through the object lens shift is inputted, performing the tracking servo after compensating for a value obtained by multiplying the amount of DC offset generated per track by the number N of jumped tracks with respect to the tracking error signal after an N-track jump.

Preferably, the step (b) further comprises the step of in case of an M-track jump through a sled servo drive, performing a sled servo by generating a sled drive signal by compensating for an initial amount of DC offset with respect to the tracking error signal after obtaining the initial amount of DC offset. Here, the initial amount of DC offset is a value obtained by multiplying the amount of DC offset generated per track by the number M of tracks to be jumped.

Preferably, at the step (b), if the whole optical pickup is moved by performing a sled servo, a value obtained by subtracting an amount of sled movement from an initial amount of DC offset is determined as a final amount of DC offset, and the tracking servo is performed as compensating for the final amount of DC offset with respect to the tracking error signal. Here, the amount of sled movement is a value obtained by subtracting the tracking error signal detected after the movement of the whole optical pickup by the sled servo drive from the tracking error signal detected before the sled servo drive.

In another aspect of the present invention, a servo method for an optical recording medium comprises the steps of (a) detecting an amount of DC offset per track as moving an object lens of an optical pickup in a specified direction, (b) in case of a normal servo, performing a tracking servo as compensating for the amount of offset per track with respect to a tracking error signal whenever the object lens is shifted, (c) in case of an N-track jump through an object lens shift, performing the tracking servo after compensating for a value obtained by multiplying the amount of DC offset generated per track by the number N of jumped tracks with respect to the tracking error signal when the tracking servo is on after an N-track jump, and (d) in case of an M-track jump through a sled servo drive, performing the tracking servo by compensating for an amount of sled movement with respect to the tracking error signal when the tracking servo is on after an M-track jump.

Preferably, the step (d) comprises the steps of obtaining an initial amount of DC offset by multiplying the DC offset generated per track by the number M of tracks to be jumped when the sled servo is driven, and performing the sled servo after generating a sled drive signal by adding the initial amount of DC offset to the tracking error signal.

Preferably, at the step (d), if the whole optical pickup is moved by performing the sled servo, a final amount of DC offset is obtained by subtracting the amount of sled movement from the initial amount of DC offset, and the tracking servo is performed by generating a tracking drive signal after subtracting the final amount of DC offset from the tracking error signal.

In still another aspect of the present invention, a servo method for an optical recording medium comprises the steps of (a) detecting an amount of DC offset per track as moving an object lens of an optical pickup in a specified direction before a servo operation for recording/reproduction, and (b) performing the recording/reproduction by performing a tracking servo as compensating for the amount of DC offset per track with respect to a tracking error signal during the normal servo operation for the recording/reproduction.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 5:
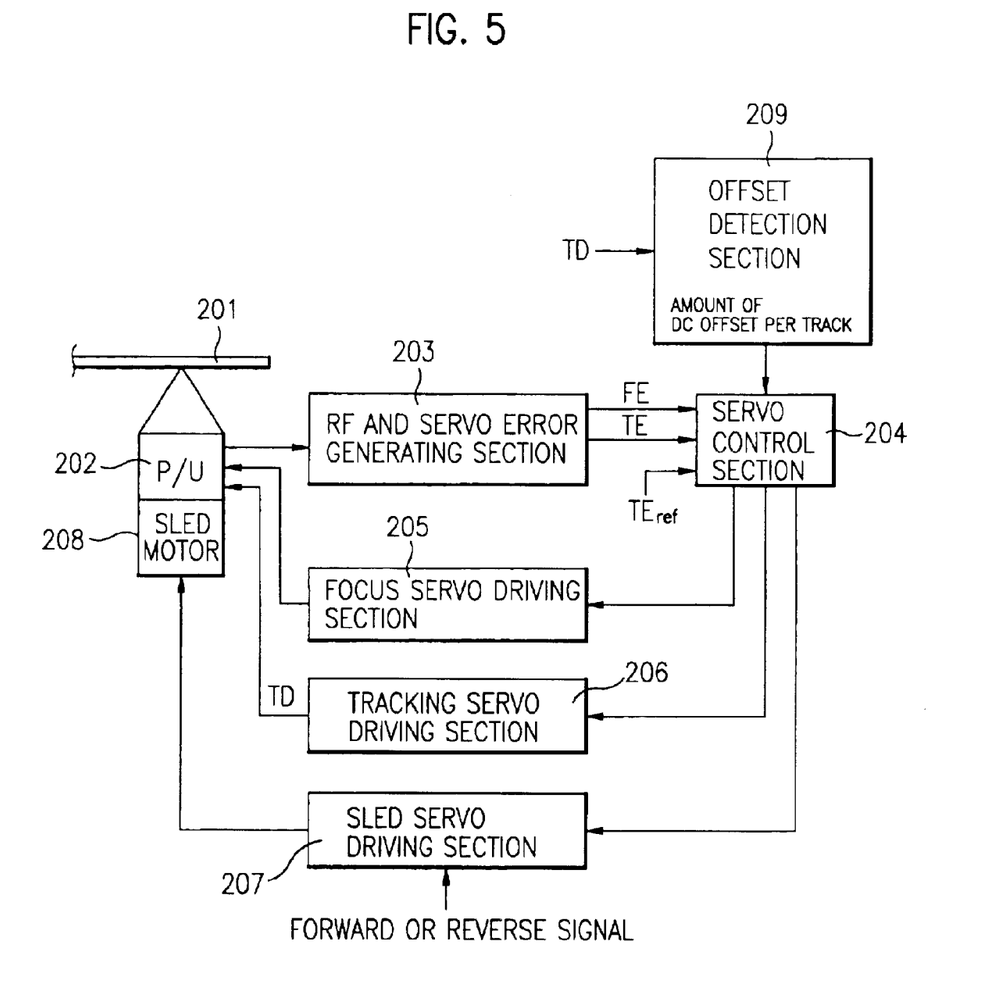
FIG. 5 is a block diagram of an optical recording/reproducing apparatus for performing a servo of an optical recording medium according to the present invention.
Figure 6:
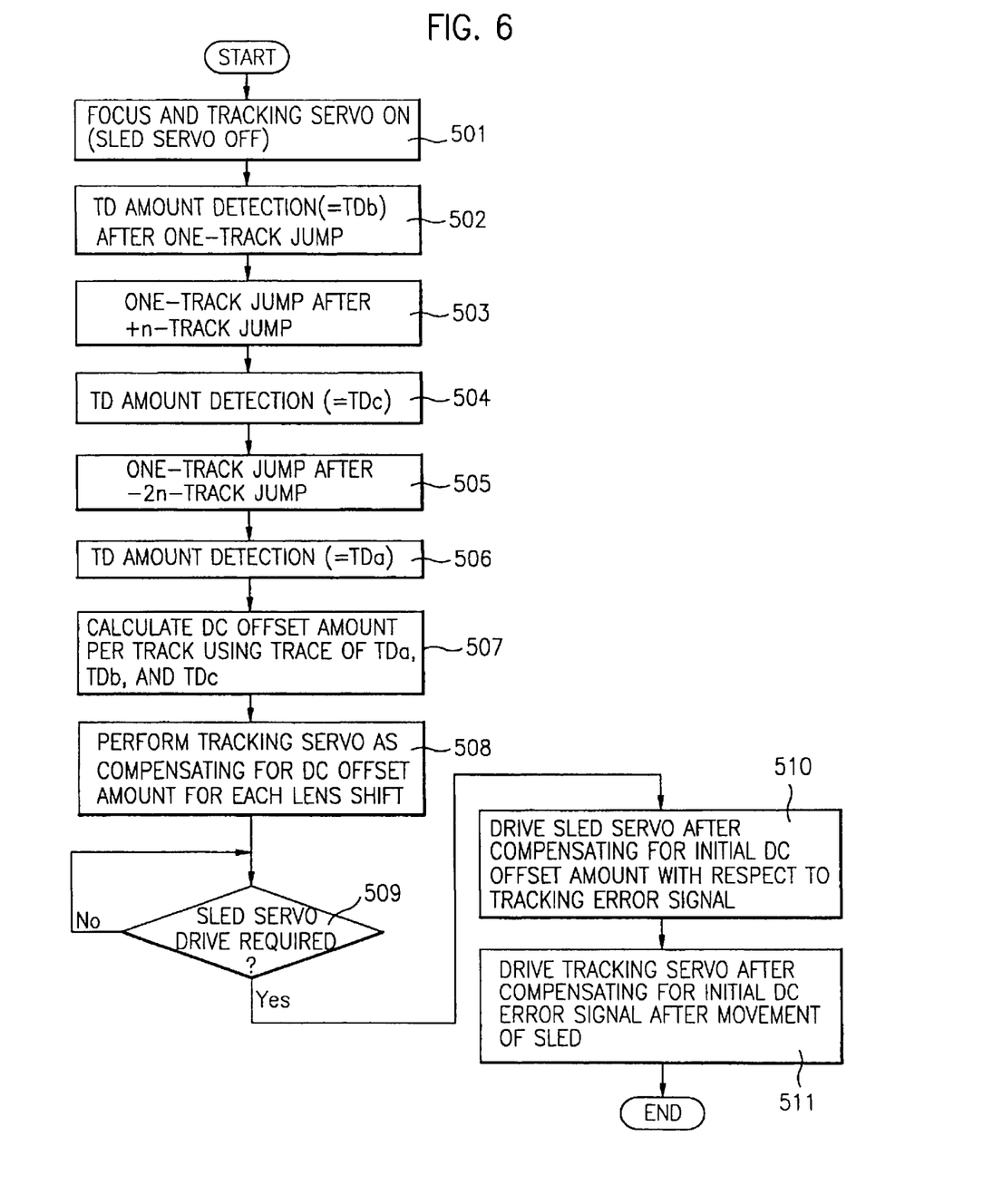
FIG. 6 is a flowchart illustrating a servo method for an optical recording medium according to the present invention.

FIG. 5 is a block diagram of an optical recording/reproducing apparatus for performing a servo of an optical recording medium according to the present invention, and FIG. 6 is a flowchart illustrating a servo method for an optical recording medium according to the present invention.

Referring to FIG. 5, an offset detection section 209 is added to the construction of FIG. 3. The offset detection section 209 detects an amount of DC offset generated per track, and outputs the detected DC offset to a servo control section 204. The servo control section 204 performs a DC offset compensation using the amount of DC offset per track when a tracking actuator in an optical pickup 202 is driven or a sled servo is driven.

For example, in case of driving the tracking actuator through the object lens shift, the servo control section obtains the amount of DC offset through the object lens shift using the amount of DC offset per track. Then, the servo control section compensates for the amount of DC offset through the object lens shift from the tracking error signal, and generates a tracking drive signal to drive the tracking actuator. Also, in case of driving the sled servo, the servo control section obtains the amount of DC offset due to the track jump using the amount of DC offset per track, and generates the tracking drive signal by compensating for a value obtained by subtracting the amount of sled movement from the amount of DC offset with respect to the tracking error signal after the movement of the optical pickup to drive the tracking actuator.

Specifically, if an optical disc is inserted, the servo control section 204 turns on a focus servo driving section 205 and tracking servo driving section 206, and in a state that a sled servo driving section 207 for moving the optical pickup 202 is turned off (step 501), it measures a tracking drive signal TDb (step 502) as performing a still function. The tracking drive signal TDb is outputted to the optical pickup 202 through the tracking servo driving section 206, and simultaneously to the offset detection section 209 for detecting the amount of DC offset. Here, the still function is to continuously follow one track by repeating a one-track jump. The tracking drive signal TDb measured at step 502 is used as a reference signal when the lens shift is not performed, and a physical track position at that time will be a reference position for detecting the DC offset.

Accordingly, after performing the step 502, the servo control section performs an n-track jump through the object lens shift in either of outer periphery and inner periphery directions from the reference position, and then measures a tracking drive signal TDc at that time (step 504) as performing the still function again (step 503).

After performing the step 504, the servo control section performs a 2n-track jump through the object lens shift in an opposite direction to the step 502, and measures the tracking drive signal TDa at that time (step 506) as performing the still function (step 505). If the n-track jump is performed in the outer periphery direction at the step 502, -2n-track jump will be performed in the inner periphery direction at the step 504.

Figure 7:
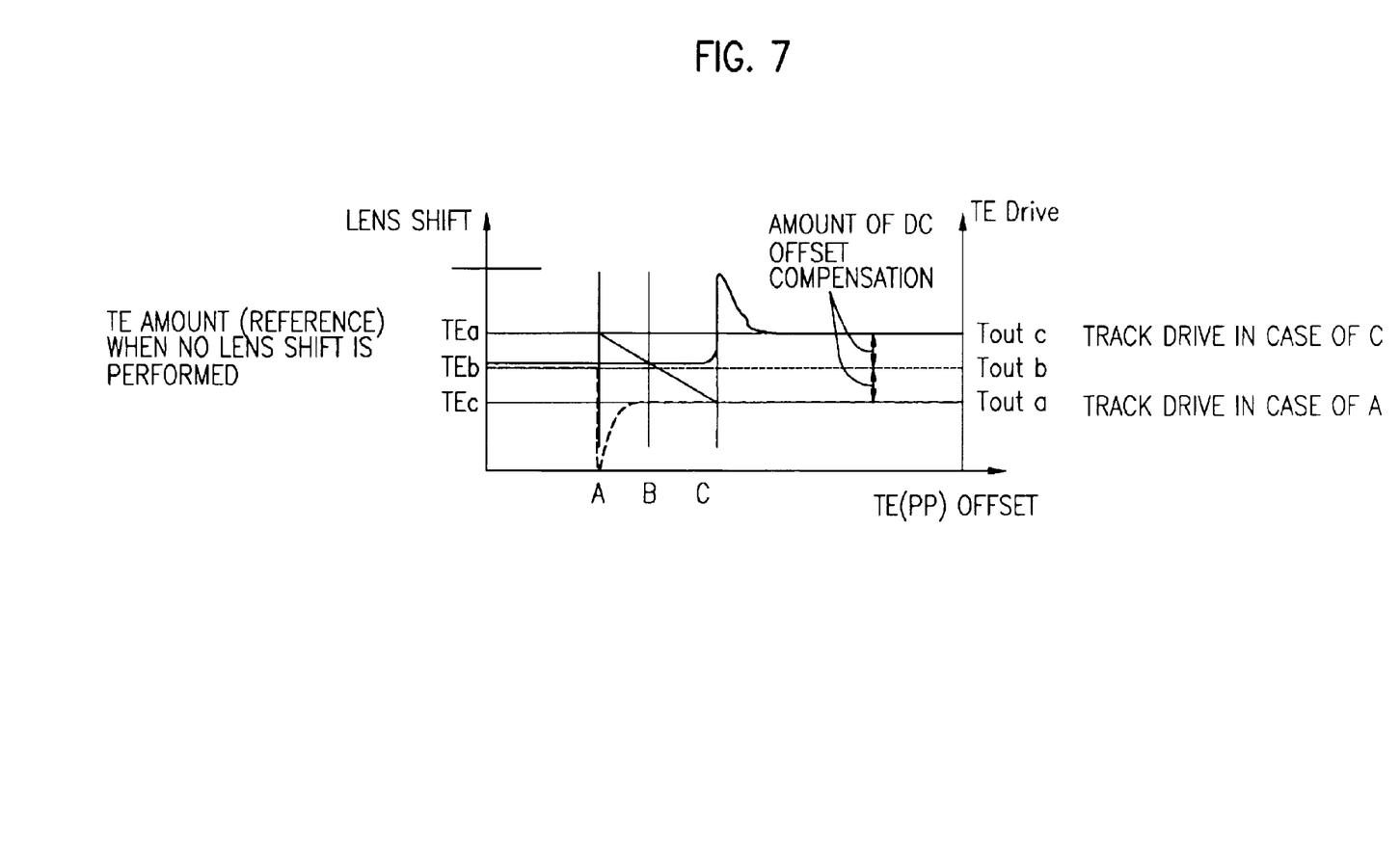
FIG. 7 is a graph showing the DC offset compensation according to the present invention when the DC offset is produced through the lens shift.
Figure 8:
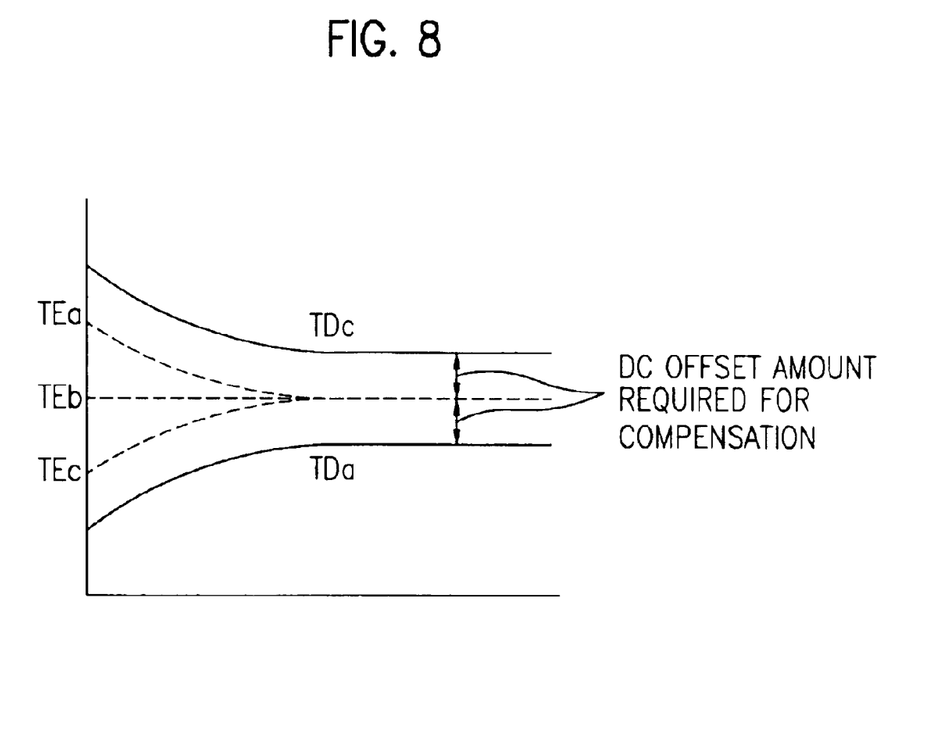
FIG. 8 is a graph showing an example of an amount of DC offset required for compensation from the relationship between the tracking error signal and tracking drive signal according to the present invention.

If TDa, TDb, and TDc are obtained as shown in FIG. 8 through the above-described process, the offset detection section 209 detects the amount of DC offset generated per track using a linear trace of the amount of TDa, TDb, and TDc as shown in FIG. 7 (step 507).

That is, the amount of DC offset generated per track can be obtained from the following equation 1.

$$TD_{offset1}=|(TDa-TDc)/2n| \qquad \text{[Equation 1]}$$

Where, $TD_{offset1}$ is the amount of DC offset generated per track.

According to equation 1, the object lens shift is respectively performed in the inner periphery and outer periphery directions from the reference position, and then the amount of DC offset generated per track is measured using the tracking drive signal at that time. However, the amount of DC offset generated per track can also be measured using the tracking drive signal after the object lens shift is performed only in one (i.e., inner periphery or outer periphery direction) direction from the reference position. The former increases the accuracy of measurement of the DC offset amount in comparison to the latter, and the latter simplifies the measurement of the DC offset in comparison to the former.

If the amount of DC offset generated per track is obtained through the above process, the servo control section 204 compensates for the amount of DC offset per track outputted from the offset detection section 209 with respect to the tracking error signal detected whenever the object lens of the tracking actuator is shifted, and generates a tracking control signal (=(tracking error signal)−(amount of DC offset per track)) (step 508). Then, the tracking servo driving section 206 generates the tracking drive signal TD in proportion to the tracing control signal outputted from the servo control section 204, and outputs the tracking drive signal to the tracking actuator in the optical pickup 202. This causes the optical beam to constantly follow the track center.

That is, even if the center of the reflected light does not coincide with the center of the optical detector due to the DC offset as shown in FIGS. 2B and 2D, the optical beam can follow the track center through the DC offset compensation.

The amount of DC offset per track at the step 507 can be obtained in advance during the disc initialization whenever the disc is inserted, and the DC offset compensation at the step 508 is performed whenever the object lens is shifted.

For example, in case of the recording operation, the servo control section 204 generates the tracking control signal obtained by subtracting the amount of DC offset $Td_{offset1}$ generated per track from the tracking error signal detected at that time. Then, the tracking servo driving section 207 performs the tracking servo by generating the tracking drive signal from tracking control signal, so that a pit is formed on the track center during the tracking operation.

Also, in case of the N-track jump through the lens shift, the amount of DC offset generated per track and the number of jumped tracks (for example, N tracks) are multiplied during the track on after the N-track jump, and the multiplied value ($TD_{offset2}$=(N tracks)*(DC offset amount per track)), i.e., the initial DC offset amount ($TD_{offset2}$) is subtracted from the tracking error signal to generate the tracking drive signal and to drive the tracking actuator. Thus, the DC offset outputted from the tracking servo driving section 206 is initialized, and the optical beam always follows the track center.

Meanwhile, the reason why the DC offset is produced during the actual servo drive is that the center of the object lens deviates from the center of the optical detector. If the sled servo driving section 207 can sufficiently follow the amount of shift of the object lens, the DC offset problem will not occur. However, the DC offset may be greatly produced according to the region where the sled cannot be driven, i.e., the dead zone and driving method.

Accordingly, it is important that the sled motor 208 rapidly escapes from the dead zone during the sled servo drive.

According to the present invention, if it is judged that the sled servo drive is necessary (step 509), the servo control section 204, in order for the sled motor to rapidly escape from the dead zone, generates the sled control signal by adding the amount of DC offset through the N-track jump, i.e., the initial amount of DC offset (TDoffset2) to the tracking error signal, and outputs the generated sled control signal to the sled servo driving section 207. In other words, the servo control section compensates for the initial amount of DC offset with respect to the tracking error signal in the opposite direction to the compensation direction of the tracking servo driving section 206, and then generates the sled control signal to control the sled servo driving section 207 (step 510).

If the whole optical pickup is moved through the drive of the sled motor 208 over the dead zone, the tracking error signal is varied abruptly, and the tracking servo is performed by compensating for the varied amount and the initial amount of DC offset with respect to the tracking error signal (step 511).

Here, the variation amount of the tracking error signal can be obtained by the following equation 2.

$$\Delta TE = \Delta TE_1 - \Delta TE_n \qquad \text{[Equation 2]}$$

where, $\Delta TE$ is the variation amount of the tracking error signal, $\Delta TE_1$ is the tracking error signal detected before the sled movement, and $\Delta TE_n$ is the tracking error signal detected after the sled movement.

Here, the variation amount of the tracking error signal will be the actual amount of sled movement. Accordingly, the servo control section 204 obtains the amount of DC offset ($TD_{offset3}$) by subtracting the amount of sled movement from the initial amount of DC offset by the following equation 3, and compensates for the final amount of DC offset with respect to the tracking error signal to output the compensated tracking error signal to the tracking servo driving section 206.

$$TD_{offset3} = TD_{offset2} - \Delta TE \quad \text{[Equation 3]}$$

$$\text{Actual } TE = TE - TD_{offset3}$$

As described above, the actual TE signal is obtained by removing from the detected TE signal a value obtained by subtracting the amount of sled movement from the initial amount of DC offset generated through the track jump. That is, if the DC offset is compensated for, a new tracking error signal is generated. Thus, if the tracking servo is controlled based on the newly obtained tracking error signal, the DC offset in the PP method is removed, and the stability of the recording/reproducing characteristics can be achieved.

Also, according to the present invention, the degree of freedom is increased during the seek operation by widening the margin of tracking control. For example, if the number of tracks that can be jumped only by the object lens shift without driving the sled motor is 150, the tracking servo according to the present invention does not deteriorate even if the track jump is performed at least twice the number.

The present invention can be applied to all optical recording media which detect the tracking error signal by the PP method.

As described above, according to the servo method for an optical recording medium according to the present invention, when no sled movement is performed, the tracking servo is performed by compensating for the tracking error signal based on the initial amount of DC offset obtained by multiplying the amount of DC offset generated per track by the number of tracks jumped by the lens shift, while after the sled movement, the tracking servo is performed by compensating for the tracking error signal based on the value obtained by subtracting the amount of sled movement from the initial amount of DC offset, so that the DC offset generated by the lens shift is compensated for, and the margin of the tracking control is widened. further, since the optical beam always follows the track center during the tracking error signal detection by the PP method, the deterioration of the tracking servo can be prevented during the tracking servo operation, and the recording/reproduction quality can be improved. Furthermore, since the sled servo is driven after the initial amount of DC offset is compensated for with respect to the tracking error signal in the opposite direction to the compensation direction of the tracking servo, the rapid response time of the sled motor can be obtained with the sled gain lowered, and this causes the transient response of sled servo to be reduced.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A servo method for an optical recording medium for performing a tracking servo and sled servo by receiving an electric signal in proportion to a quantity of reflected light outputted from an optical pickup and detecting a tracking error signal by a push-pull method, the method comprising the steps of:

(a) detecting an amount of offset per track as moving an object lens of the optical pickup in a specified direction; and
   (b) performing the tracking servo by generating a tracking drive signal as compensating for the amount of offset with respect to the tracking error signal during a normal servo operation,
   wherein the step (a) comprises the steps of:
      detecting a first tracking drive signal as performing a still function in a reference position where no object lens shift is performed after turning on the tracking servo and turning off a sled servo;
      detecting a second tracking drive signal as performing a still function after performing an n-track jump through the object lens shift in either of inner and outer periphery directions from the refernce position;
      detecting a third tracking drive signal as performing a still function after performing a 2n-track jump through the object lens shift in a direction opposite to the direction at the second tracking drive signal detection step; and
      detecting the amount of DC offset per track generatee through the object lens shift from the first to third tracking drive signals obtained at the tracking drive signal detection steps.

2. The servo method as claimed in claim 1, wherein at the step of detecting the amount of DC offset per track, the amount of DC offset per track is detected by multiplying a average value of the second and third tracking drive signals by $1/n (=(\text{second tracking drive signal} + \text{third tracking drive signal})/2n)$.

3. The servo method as claimed in claim 1, wherein the step (b) further comprises the step of if an N-track jump command through the object lens shift is inputted, performing the tracking servo after compensating for a value obtained by multiplying the amount of DC offset generated per track by the number N of jumped tracks with respect to the tracking error signal after an N-track jump.

4. The servo method as claimed in claim 1, wherein the step (b) further comprises the step of in case of an M-track jump through a sled servo drive, performing a sled servo by generating a sled drive signal by compensating for an initial amount of DC offset with respect to the tracking error signal after obtaining the initial amount of DC offset. Here, the initial amount of DC offset is a value obtained by multiplying the amount of DC offset generated per track by the number M of tracks to be jumped.

5. The servo method as claimed in claim 4, wherein the direction where the amount of DC offset is compensated for with respect to the tracking error signal to generate the sled drive signal is opposite to the direction where the amount of DC offset is compensated for with respect to the tracking error signal to generate the tracking drive signal.

6. The servo method as claimed in claim 4, wherein the initial amount of DC offset is a value obtained by multiplying the amount of DC offset generated per track by a number M of tracks to be jumped.

7. The servo method as claimed in claim 4, wherein at the step (b), if the whole optical pickup is moved by performing a sled servo, a value obtained by subtracting an amount of sled movement from the initial amount of DC offset is determined as a final amount of DC offset, and the tracking servo is performed as compensating for the final amount of DC offset with respect to the tracking error signal.

8. The servo method as claimed in claim 7, wherein the amount of sled movement is a value obtained by subtracting the tracking error signal detected after the movement of the whole optical pickup by the sled servo drive from the tracking error signal detected before the sled servo drive.

9. A servo method for an optical recording medium for performing a tracking servo and sled servo by receiving an electric signal in proportion to a quantity of reflected light outputted from an optical pickup and detecting a tracking error signal by a push-pull method, the method comprising the steps of:
(a) detecting an amount of DC offset per track as moving an object lens of an optical pickup in a specified direction; and
(b) performing the tracking servo based on the amount of DC offset such that
(b1) in case of a normal servo, performing the tracking servo as compensating for the amount of offset per track with respect to the tracking error signal whenever the object lens is shifted;
(b2) in case of an N-track jump through an object lens shift, performing the tracking servo after compensating for a value obtained by multiplying the amount of DC offset generated per track by the number N of jumped tracks with respect to the tracking error signal when the tracking servo is on after an N-track jump; and
(b3) in case of an M-track jump through a sled servo drive, performing the tracking servo by compensating for an amount of sled movement with respect to the tracking error signal when the tracking servo is on after an M-track jump.

10. The servo method as claimed in claim 9, wherein the step (a) comprises the steps of:
detecting a first tracking drive signal as performing a still function in a reference position where no object lens shift is performed after turning on the tracking servo and turning off a sled servo;
detecting a second tracking drive signal as performing a still function after performing an n-track jump through the object lens shift in either of inner and outer periphery directions from the reference position;
detecting a third tracking drive signal as performing a still function after performing a 2n-track jump through the object lens shift in a direction opposite to the direction at the second tracking drive signal detection step; and
detecting the amount of DC offset per track generated through the object lens shift from the first to third tracking drive signals obtained at the tracking drive signal detection steps.

11. The servo method as claimed in claim 10, wherein at the step of detecting the amount of DC offset per track, the amount of DC offset per track is detected by multiplying a average value of the second and third tracking drive signals by $1/n(=$(second tracking drive signal+third tracking drive signal$)/2n)$.

12. The servo method as claimed in claim 9, wherein the step (b2) performs the tracking servo by generating the tracking drive signal after subtracting a value obtained by multiplying the amount of DC offset generated per track by the number N of jumped tracks from the tracking error signal.

13. The servo method as claimed in claim 9, wherein the step (b3) comprises the steps of:
obtaining an initial amount of DC offset by multiplying the DC offset generated per track by the number M of tracks to be jumped when the sled servo is driven; and
performing the sled servo after generating a sled drive signal by adding the initial amount of DC offset to the tracking error signal.

14. The servo method as claimed in claim 13, wherein at the step (b3), if the whole optical pickup is moved by performing the sled servo, a final amount of DC offset is obtained by subtracting the amount of sled movement from the initial amount of DC offset, and the tracking servo is performed by generating a tracking drive signal after subtracting the final amount of DC offset from the tracking error signal.

15. The servo method as claimed in claim 10, wherein the amount of sled movement is a value obtained by subtracting the tracking error signal detected after the movement of the whole optical pickup by the sled servo drive from the tracking error signal detected before the sled servo drive.

* * * * *